UNITED STATES PATENT OFFICE.

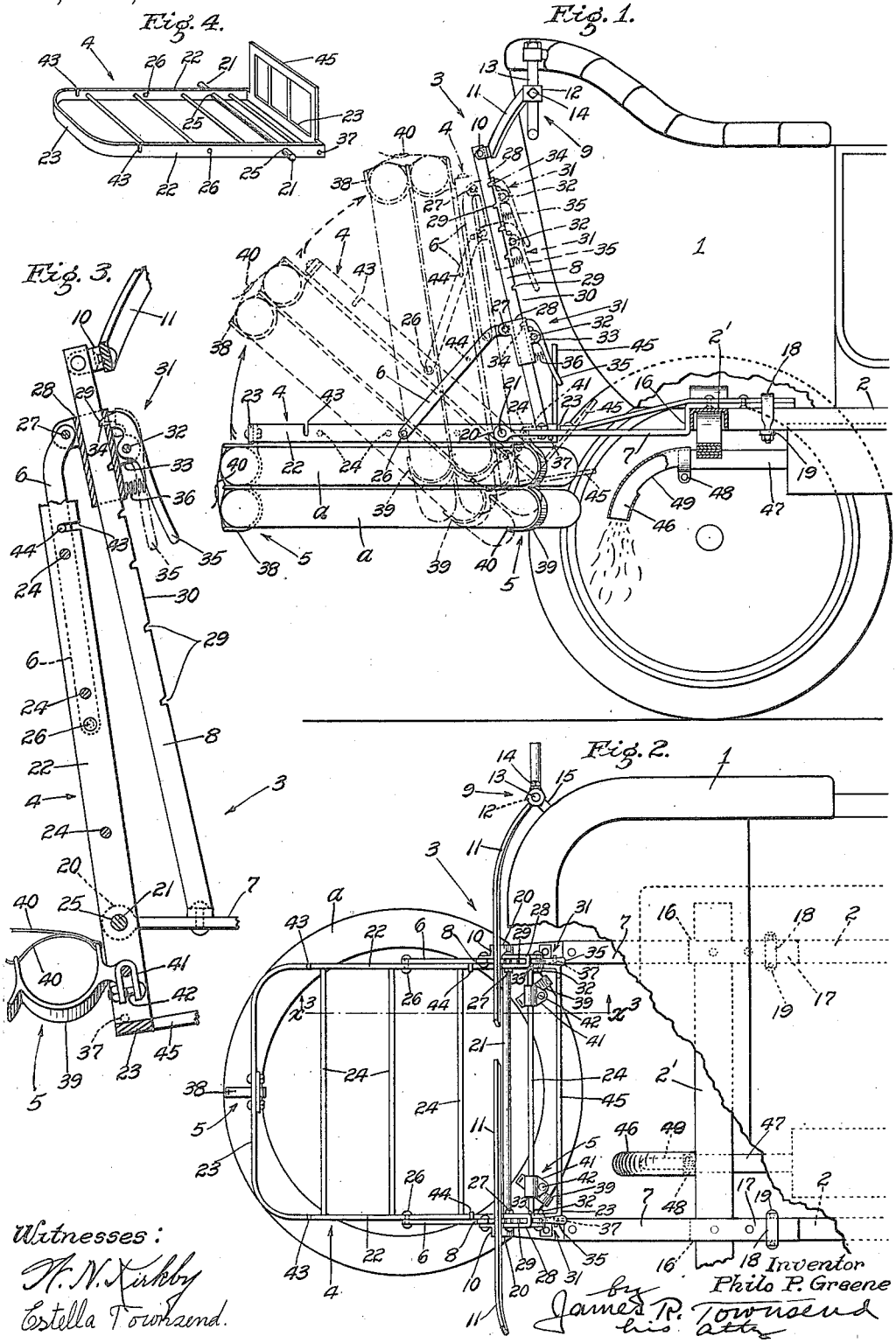

PHILO PITT GREENE, OF FILLMORE, CALIFORNIA.

COMBINED BAGGAGE AND TIRE HOLDER.

1,179,823.  Specification of Letters Patent.  Patented Apr. 18, 1916.

Application filed May 29, 1915. Serial No. 31,289.

*To all whom it may concern:*

Be it known that I, PHILO PITT GREENE, a citizen of the United States, residing at Fillmore, in the county of Ventura and State of California, have invented a new and useful Combined Baggage and Tire Holder, of which the following is a specification.

An object of this invention is to provide a device of this character which may be readily attached to the back of an automobile to serve both as a holder for extra tires or wheels and as a baggage holder for trunks and the like.

More specifically the holder comprises a pivotally supported rack having tire-holding means mounted upon its back, said rack being pivotally mounted on a horizontal axis and adapted to swing downwardly into baggage-holding position and to tilt upwardly to stand adjacent to the rear end of the automobile body when not in use as a baggage holder. By this novel construction the top of the rack when lowered affords a support for luggage irrespective of whether or no tires are carried upon the back of the rack, and the back of the rack is always available as a support for extra tires and is never in the way of the luggage.

Another object of the invention is the provision of adjustable supporting means for the rack of the holder whereby said rack may be supported in various upwardly inclined positions to hold parcels of baggage or may be supported in a horizontal position to be utilized as a trunk carrier.

Another feature is the adjustability of the tire holding means for various sizes of tires, whereby the extra tires or wheels of the automobile to which the device is to be attached may be readily applied to the holder.

Other objects are to construct a device of this character that can be quickly and easily attached to an automobile without marring the body or in any way changing the automobile construction and to provide locking means to positively support the holder in adjustable positions and thus minimize the liability of losing baggage carried by the holder.

These and other features and advantages will become apparent from the subjoined detail description of one embodiment of the invention.

The accompanying drawings illustrate the invention.

Figure 1 is a fragmental side elevation illustrating the application of the holder embodying this invention as attached to the back of an automobile. Solid lines show parts in horizontal baggage-holding position, dot and dash lines indicate parts in an up-ended position assumed when not in use as a baggage holder, and dash lines indicate parts in an intermediate baggage-holding position. A portion of the automobile body is broken away and parts shown in section for clearness of illustration. Fig. 2 is a fragmental plan view showing the device attached to the automobile in baggage-holding position, corresponding to the solid line position of Fig. 1. Fig. 3 is an enlarged fragmental, sectional elevation viewed from line $x^3$—$x^3$, Fig. 2, parts being in the tilted-up position corresponding to dot and dash lines in Fig. 1. Fig. 4 is a perspective view of the baggage rack detached.

The automobile body 1 shown in the drawings is mounted in the usual manner upon the automobile frame, which in the instance shown comprises side members 2 and a rear transverse member 2′, and at the rear of the body 1 is suitably attached a carrier-frame 3 which serves to pivotally mount a baggage holding rack 4 having tire holding means 5 upon its back, said rack being adjustably supported in various positions by means of folding side connections 6.

The carrier-frame comprises two side brackets 7, arranged to extend rearwardly from the automobile frame to which brackets are rigidly fixed upright side stanchions 8 that preferably extend slightly aslant rearwardly and upwardly, the upper ends of said stanchions being suitably supported from the body 1. In the present instance, said upper stanchion ends are secured by riveted clips 10 to a transverse bar 11 that extends across at the back of the automobile body just below the top of the rear seat, said transverse bar terminating in side collars 12 that are adjustably mounted upon the vertical legs 13 of the automobile topholders by means of set screws 14. The topholders are mounted at the rear of the body 1 by the usual side arms 15 and are of the usual type for supporting the automobile top when folded down.

The carrier frame may be additionally strengthened by means of any preferred form of cross bracing, not shown, between the side stanchions 8, and the brackets 7 may be made of single drop forgings or of bar material as in the instance shown, each bracket having a shoulder 16 abutting against the transverse frame member 2' in alinement with a side member 2, the bracket end portion 17 extending over said side member where it is held in place by means of a U-shaped clamp 18, the threaded bolt extremities of which pass through a crosspiece 19 arranged on the under-side of the side member and thus securely and rigidly clamp the bracket in place.

By means of the adjustable collars 12 the carrier-frame 3 consisting of the brackets 7, stanchions 8 and cross-bar 11; is applicable to bodies of different heights and may be readily attached by clamping said brackets in place upon the frame members and positioning the collars upon the top-holders 9.

The brackets 7 terminate in bearings 20 which carry a transverse shaft or fulcrum pivot 21 upon which is pivotally mounted the holder rack 4, formed by side bars 22, end bars 23 and cross-bars 24, said cross-bars being preferably arranged transversely of the rack. The side bars 22 are provided with bores 25 through which the shaft 21 extends and the side connections 6 are pivoted to said bars 22 at 26, rearwardly of the bores 25, the connections having their other ends pivoted at 27 to a sliding clamp 28 mounted upon the upright stanchions 8, which clamp is slidable up and down on the stanchions to raise and lower the rack through the connections 6.

The shaft 21 affords a horizontal axis upon which the rack is pivotally mounted, being adapted to stand practically upright behind the body of the vehicle and to be lowered to the horizontal position shown in Fig. 1, and adapted to be supported at various angles for holding bags or trunks as the case may demand, and also for fitting tightly against whatever luggage may be placed on the rack, this being accomplished by adjustable supports, the adjustment of which is secured in the form shown by slidable clamps as shown at 28. Said slidable clamps 28 are adjustably secured upon the stanchions to adjustably support the rack, and in order to insure against said clamps slipping or jarring out of position after being set by the operator the stanchions 8 are each provided with notches 29 spaced apart at appropriate intervals along the front edge faces 30 thereof, which notches, together with clamp latches 31, constitute locking means to positively hold the clamps and thus positively support the rack.

Each slidable clamp preferably surrounds its stanchion and is provided upon the face opposite the connection pivot 27 with a pivot pin 32 carried by ears 33, said pin pivotally mounting the clamp latch 31 that has a catch tooth 34 at one side of the pivot 32 and a handle 35 at the other side. A spring 36 interposed between the handle 35 and clamp body serves to normally hold the catch tooth in engagement with a notch 29 and thereby lock the clamp against movement upon the stanchion.

The side clamps may each be unlatched by the operator upon depressing the handles 35 and withdrawing the catch teeth 34 from the path of the teeth whereupon said clamps are free to be moved up or down along their stanchions to move the connections 6 to tilt the rack about its fulcrum pivot 21. Stops in the form of pins 37 are provided upon the sides of the rack near the rear end bar 23, each stop pin being adapted to engage with the under face of a bracket when the rack is moved into horizontal position to thereby limit the downward rack movement and prevent said rack from tilting below a horizontal position.

The arrangement of the notches 29 is such that when the clamp is in position with the catch tooth 34 engaging with the lowermost notch, the rack is supported through the connections 6 in horizontal position where it is adapted to be used as a trunk carrier; and when the clamp is in position with said tooth engaging with the uppermost notch the rack is supported in up-ended position where it is out of use as a baggage holder, the notches altogether equaling in number the different positions to which it is desired to support the rack. The intermediate notches may be variously positioned and in the instance shown are spaced farther apart as they approach the lowermost notch to thus compensate for the irregularities in the vertical and horizontal movement of the connection pivots 26 as the rack tilts about the fulcrum 21. By this spacing, an equal arc distance between the different adjustable inclined positions of the rack is secured.

The tire-holding means 5 upon the back of the rack may be utilized at all times to support the extra tires or wheels $a$ either with the rack in a baggage-holding position or tilted up out of baggage-holding position, see Fig. 1, without in any way interfering with the device as a baggage-holder. In order to support the extra tires of different automobiles to which the device may be applied said tire-holding means is made adjustable and in the instance shown, comprises a fixed clip 38 suitably secured to the front end bar 23 and a slidable clip 39 mounted one upon each side of a transverse cross-bar 24, the fixed clip and two slidable clips having suitable retaining means as the straps 40. The slidable clips 39 each terminate in a clamp hanger 41 having a clamp bolt 42, see Fig. 3, by which said clips are adjustably secured in position upon the cross bar to form with the fixed clip 38 a three-point tire support.

The position of the holder rack when in up-ended position is slightly inclined rearwardly and upwardly with the rack and its connections 6 folded together, preferably in parallelism with one another, as indicated in dot and dash lines, Fig. 1. In this tilted-up position the weight of the tires $a$ tends to cause rattling and looseness of the rack during the course of travel of the automobile over the road and means are provided to hold the rack and its folded connections 6 in fixed relation to one another to thus insure against the aforesaid rattling and looseness. Said means comprise top notches 43 positioned in the side bars 22 between the connection pivot 26 and the front end bar 23, and projecting pins 44 arranged upon the inner sides of the connections 6; the distance from a pivot 26 to the adjacent notch being the same as the distance from said pivot to the adjacent pin 44. The pins 44 are thus arranged in the path of travel of the notches 43 when the rack is tilted upward, and the arrangement of parts is such that as the clamps are moved upwardly along the stanchions to the topmost position indicated in dot-and-dash lines, Fig. 1, the rack is tilted upwardly and the connections 6 folded forwardly until said rack and connections are brought into parallelism, where the notches 43 will tightly engage with the pins 44, as shown in Fig. 3. This notch and pin arrangement acts with the clamp latch 31 to firmly and rigidly secure the rack in up-ended position.

Provision may be made to prevent small parcels of baggage such as suit cases and the like from sliding off the rack at the front thereof when said rack is adjusted in an inclined position as indicated in dash lines, Fig. 1, which provision, in the instance shown, consists of a ledge member 45 extending up from the front bar 23 of the rack, substantially at right angles thereto.

A deflector attachment 46 may be attached to the end of the exhaust pipe 47 by suitable means as a clamp connection 48, the purpose of said attachment being to direct the exhaust gases downwardly, so that the tires $a$ upon the holder rack will not lie in the path of the usual muffler exhaust. The attachment is preferably made in the form of a pipe elbow and may have a vent 49 to relieve any back pressure that might otherwise occur due to changing the course of the exhaust gases.

The operation and mode of construction of my holder device will be clear from the foregoing detailed description, but it is understood, however, that I do not contemplate limiting myself to the specific form shown and described.

I claim:—

1. The combination with an automobile, of a carrier-frame attached to said automobile, a rack pivotally mounted, on a horizontal axis, upon said carrier-frame, tire holding means on the rack, and a connection between the carrier-frame and the rack to support said rack in baggage holding position.

2. The combination with an automobile, of a carrier-frame attached to said automobile, a rack pivotally mounted, on a horizontal axis, upon said carrier-frame, adjustable tire holding means on the rack, and a connection between the carrier-frame and the rack to support said rack in baggage holding position.

3. The combination with an automobile, of a carrier-frame attached to said automobile, a rack pivotally mounted, on a horizontal axis, upon said carrier-frame, tire holding means on the rack, and a connection pivoted to the rack and adjustably secured to the carrier to support the rack in baggage holding position.

4. The combination with an automobile body, of a carrier-frame attached at the rear of said body and provided with upright side stanchions, a rack pivotally mounted upon said carrier fram, tire holding means on the rack, and side connections pivoted to the rack and adjustably mounted upon said stanchions to adjustably support the rack.

5. The combination with an automobile frame having a body mounted thereon, of brackets extending rearwardly from said frame and terminating in bearings, side stanchions rigidly fixed to said brackets and extending upwardly at the rear of said body, a rack pivotally mounted between said bearings, tire-holding means on the rack, a connection pivoted to the rack and slidably mounted upon said stanchions, and means to lock said connection upon the stanchions to positively support the rack.

6. The combination with an automobile frame having a body mounted thereon, of brackets extending rearwardly from said frame and terminating in bearings, side stanchions rigidly fixed to said brackets and extending upwardly at the rear of said body, slidable clamps mounted on said stanchions, a holder rack pivotally mounted between said bearings, a connection between the rack and said slidable clamps, and means to lock said slidable clamps upon the stanchions to positively support the rack.

7. The combination with an automobile frame having a body mounted thereon, of brackets extending rearwardly from said frame and terminating in bearings, side stanchions rigidly fixed to said brackets and extending upwardly at the rear of said body, slidable clamps mounted on said stanchions, a holder rack pivotally mounted between said bearings, a connection between the rack and said slidable clamps, and spring latches on the clamps adapted to normally engage with said stanchions to lock the slidable clamps upon the stanchions to positively support the rack.

8. The combination with an automobile frame having a body mounted thereon; of brackets extending rearwardly from said frame and terminating in bearings, side stanchions rigidly fixed to said brockets and extending upwardly at the rear of said body, slidable clamps mounted on said stanchions, a holder rack pivotally mounted between said bearings, a connection between the rack and said slidable clamps, and latches mounted upon said clamps each of said latches being provided with a catch tooth, the catch teeth of said latches being adapted to engage with said stanchions to thereby lock the slidable clamps upon the stanchions to positively support the rack.

9. The combination with an automobile frame having a body mounted thereon, of brackets extending rearwardly from said frame and terminating in bearings, side stanchions rigidly fixed to said brackets and extending upwardly at the rear of said body, a tilting holder rack pivotally mounted between said bearings, a connection pivoted to the rack and adjustably mounted upon said stanchions to support the rack, and stop means upon said rack adapted to engage with said brackets to thereby limit the downward movement of the rack.

10. The combination with an automobile frame having a body mounted thereon, of brackets extending rearwardly from said frame and terminating in bearings, side stanchions rigidly fixed to said brackets and extending upwardly at the rear of said body, a tilting rack pivotally mounted between said bearings and provided with notches in its sides, tire-holding means on the rack, connections pivoted to the rack and adjustably mounted upon said stanchions, said connections being provided with pins adapted to engage with said rack notches as the rack is tilted into up-ended position, to thus insure against looseness of the rack.

11. The combined baggage and tire holder comprising a pivotally supported tilting rack having tire-holding means mounted upon its back, said rack being pivotally mounted on a horizontal axis and adapted to swing downwardly into baggage-holding position and to tilt upwardly to stand adjacent to the rear end of the vehicle body when not in use as a baggage-holder.

12. The combined baggage and tire holder comprising a pivotally supported tilting rack having tire-holding means mounted upon its back, said rack being pivotally mounted on a horizontal axis and adapted to swing downwardly into baggage-holding position and to tilt upwardly to stand adjacent to the rear end of the vehicle body when not in use as a baggage-holder; and adjustable supporting means for the rack whereby said rack may be supported in various upwardly inclined positions to hold parcels of baggage or may be supported in a horizontal position to be utilized as a trunk-carrier.

In testimony whereof, I have hereunto set my hand at Fillmore, California, this 22nd day of May, 1915.

PHILO PITT GREENE.

In presence of—
T. H. ZIMMERMAN.